United States Patent
Bachl et al.

(10) Patent No.: US 7,526,304 B2
(45) Date of Patent: Apr. 28, 2009

(54) METHOD OF INCREASING THE CAPACITY OF ENHANCED DATA CHANNEL ON UPLINK IN A WIRELESS COMMUNICATIONS SYSTEM

(75) Inventors: Rainer Walter Bachl, Nuremberg (DE);
Anil M Rao, Cedar Knolls, NJ (US);
Mirko Schacht, Nuremberg (DE);
Henry Hui Ye, Ledgewood, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 325 days.

(21) Appl. No.: 11/239,604

(22) Filed: Sep. 29, 2005

(65) Prior Publication Data
US 2007/0070926 A1 Mar. 29, 2007

(51) Int. Cl.
*H04B 7/00* (2006.01)
*G01R 31/08* (2006.01)

(52) U.S. Cl. ................. 455/515; 455/511; 455/452.2; 370/235

(58) Field of Classification Search ............. 370/437, 370/340, 235; 455/515, 511, 434
See application file for complete search history.

(56) References Cited

U.S. PATENT DOCUMENTS 6,668,168 B1 * 12/2003 Moulsey et al. ............. 455/434

2003/0073409 A1 * 4/2003 Nobukiyo et al. .......... 455/67.1
2004/0047321 A1   3/2004 Bui ............................ 370/338
2004/0131106 A1 * 7/2004 Kanterakis .................. 375/141

FOREIGN PATENT DOCUMENTS

WO   WO 02/065720   *  8/2002
WO   WO02065720    *  8/2002   .............. 370/437

OTHER PUBLICATIONS

Siemens, "R1-041354, CR 25.212—Introduction of E-DCH," *TSG-RAN WG1 #39*, (Nov. 12, 2004), 2 pages.
International Search Report, PCT/US2006/037188, (Sep. 25, 2006), 3 pages.

* cited by examiner

*Primary Examiner*—Nick Corsaro
*Assistant Examiner*—Shannon R Brooks

(57) ABSTRACT

In a UMTS wireless communication system, the enhanced dedicated physical control channel (E-DPCCH) that is usually always transmitted together with the enhanced dedicated physical data channel (E-DPDCH) on the uplink from a UE to a NodeB is instead only transmitted when a predetermined "start criterion" is met and is turned off when a predetermined "stop criterion" is met until a "start criterion" is later met again. The UE starts transmitting E-DPCCH whenever the corresponding E-DPDCH transport format combination is different from the previous one in the same HARQ process or some other "start criterion" is met. Multiple mechanisms can be used to decide when the UE should switch off E-DPCCH transmission after the transport format combination of E-DPDCH has changed.

14 Claims, 3 Drawing Sheets

METHOD OF INCREASING THE CAPACITY OF ENHANCED DATA CHANNEL ON UPLINK IN A WIRELESS COMMUNICATIONS SYSTEM

CROSS-REFERENCE TO RELATED APPLICATIONS

This application is related to co-pending U.S. patent application Ser. No. 11/190,617, filed Jul. 27, 2005.

TECHNICAL FIELD

This invention relates to wireless communications.

BACKGROUND OF THE INVENTION

A wireless communications network typically includes a variety of communication nodes coupled by wireless or wired connections and accessed through different types of communications channels. Each of the communication nodes includes a protocol stack that processes the data transmitted and received over the communications channels. Depending on the type of communications system, the operation and configuration of the various communication nodes can differ and are often referred to by different names. Such communications systems include, for example, a Code Division Multiple Access 2000 (CDMA2000) system and a Universal Mobile Telecommunications System (UMTS).

Third generation wireless communication protocol standards (e.g., 3GPP-UMTS, 3GPP2-CDMA2000, etc.) may employ a dedicated traffic channel in the uplink (e.g., a communication flow between a mobile station (MS) or User Equipment (UE), and a base station (BS) or NodeB. The dedicated physical channel may include a data part (e.g., a dedicated physical data channel (DPDCH) in accordance with UMTS Release 4/5 protocols, a fundamental channel or supplemental channel in accordance with CDMA2000 protocols, etc.) and a control part (e.g., a dedicated physical control channel (DPCCH) in accordance with UMTS Release 4/5 protocols, a pilot/power control sub-channel in accordance with CDMA2000 protocols, etc.).

Newer versions of these standards, for example, Release 6 of UMTS provide for high data rate uplink channels referred to as enhanced dedicated physical channels. These enhanced dedicated physical channels may include an enhanced data part (e.g., an enhanced dedicated physical data channel [E-DPDCH] in accordance with UMTS protocols) and an enhanced control part (e.g., an enhanced dedicated physical control channel [E-DPCCH] in accordance with UMTS protocols). As defined in the specification of the enhanced uplink data channel, the UE transmits a frame of data in the E-DPDCH simultaneously with a frame of control information in the E-DPCCH channel. This control information communicated from UE to NodeB includes parameters that are in general necessary for NodeB to decode the E-DPDCH frame. An E-DPCCH word includes seven E-TFCI (E-DCH [enhanced-uplink dedicated channel] transport format combination indicator) bits that provide to the NodeB information from which NodeB can determine actual combination of pre-defined transport channels within the E-DPDCH data frame, including the packet size for each individual transport channel. This is needed because multiple transport channels can be multiplexed into the physical channel based on the type of the applications and the dynamic nature of packet data communication. Generally, two frame sizes (TTI lengths), i.e., 10 ms and 2 ms, are available for use in the E-DPDCH. In addition, an E-DPDCH word includes two RSN (retransmission sequence number) bits that indicate the redundancy version of the data frame. The redundancy version is needed because the NodeB needs to know whether a frame is transmitted for the first time, or a HARQ (Hybrid Automatic Repeat Request) retransmission of theframe, and specifically whether it's a second, third or larger than third transmission of the dataframe. If a previous transmission has not been acknowledged by any of the NodeBs that might be communicating with a UE, the UE will retransmit the same frame unless an acknowledgement (ACK) is received from at least one NodeB, or the maximum allowable number of retransmissions of the same frame has been reached. Therefore, even if a NodeB was not able to decode a frame transmission previously, it cannot predict whether the UE will send a new transmission of another frame or the retransmission of the previous frame since the previous frame might have been acknowledged by another NodeB with which the UE was communicating. The E-DPCCH word also includes a single happy bit (H-bit), which indicates to the NodeB that the UE wants to transmit at a higher or lower rate. An E-DPCCH word contains 10-bits.

The E-DPCCH is usually transmitted with sufficient power to guarantee that the NodeBs can decode this channel correctly. For UEs that transmit E-DPDCH with a large number of data bits per frame, the total power given to the E-DPCCH channel is only a small fraction of the power given to all E-DPDCH channels. However, for applications such a VoIP (Voice-over-IP), the UEs transmits E-DPDCH with a small number of data bits per frame only. In this latter case, the power given to E-DPCCH is significant compared with the power given to the corresponding E-DPDCH of the same UE. There are also other situations where E-DPCCH power is significant compared to the E-DPDCH power, which is the case whenever UEs are transmitting with low data rates on E-DPDCH. In particular, very low data rates are often assigned to UEs with unfavorable path loss conditions in heavily loaded cells.

Disadvantageously, the additional power required for transmitting E-DPCCH can significantly reduce the overall capacity on the reverse channel. As noted, there are two different frame sizes (10 ms and 2 ms TTI lengths). For VoIP applications, the 2 ms TTI length may be preferred since it introduces less delay as compared with the 10 ms TTI length, in particular when using a larger number of HARQ retransmissions leading to improved time diversity. The overhead due to E-DPCCH is even more significant for a 2 ms TTI length, however, because there is a higher effective E-DPCCH data rate and less diversity gain as compared to the case of a 10 ms TTI length.

SUMMARY OF THE INVENTION

In accordance with an embodiment of the present invention, E-DPCCH power is significantly reduced and the capacity for applications using the enhanced uplink data channel is thus greatly increased by transmitting E-DPCCH in association with a corresponding E-DPDCH transmission only selectively and not transmitting E-DPCCH at other times. To that end, E-DPCCH is only transmitted when at least one predetermined "start criterion" is met and is turned off when a predetermined "stop criterion" is met and remains off until a "start criterion" is later met again. Specifically, E-DPCCH is transmitted when a frame being transmitted on the corresponding E-DPDCH differs in the transport format combination from the E-DPDCH frame previously transmitted within the same HARQ process. Transmission of E-DPCCH is continued until a notification is received that one or more NodeBs to which the transmitting UE has successfully decoded at least one frame, where upon such notification, transmission of E-DPCCH is stopped.

In a first exemplary embodiment, E-DPCCH continues to be transmitted until all NodeBs that the UE is transmitting to return a positive acknowledgment that they have successfully decoded at least one E-DPDCH frame. Upon receiving all acknowledgments, the UE switches off E-DPCCH transmission. Transmission of E-DPCCH resumes when the E-DPDCH transport format combination (e.g., the packet size of a transport channel) changes. In this embodiment, when no E-DPCCH information is received, NodeB assumes that the transport format combination information is the same as in the last received E-DPCCH transmission. It then attempts to decode the received frame using different redundancy versions and number of retransmissions until a correct CRC is determined or not.

In a second exemplary embodiment, E-DPCCH continues to be transmitted until at least one NodeB that the UE is transmitting to returns a positive acknowledgment that it has successfully decoded at least one E-DPDCH frame. Upon receiving one such acknowledgment, the UE switches off E-DPCCH transmission. Transmission of E-DPCCH resumes when the E-DPDCH transport format combination changes or when all NodeBs to which the UE is transmitting fail to return a positive acknowledgement of any given transmitted E-DPDCH frame after the maximum number of allowable retransmissions. The Node functions as in the first embodiment.

A third embodiment is a modification of the first embodiment in that E-DPCCH continues to be transmitted until all NodeBs that the UE is transmitting to return a positive acknowledgment that they have successfully decoded at least one E-DPDCH frame. Upon receiving all acknowledgments, the UE switches off E-DPCCH transmission. In this embodiment, however, when E-DPCCH is turned off the UE also sends a new-transmission flag of minimum bit length, such as a single bit flag, referred to as new-transmission-flag (new-tx-flag), to the NodeBs only when a new E-DPDCH frame is being transmitted for the first time. Thus, if NodeB does not detect the E-DPCCH transmission, but does detect the new-tx-flag, it uses the previous transport format combination and assumes the transmission on the E-DPDCH to be a new transmission (a redundancy version equal to 0). If NodeB does not detect the E-DPCCH transmission or the new-transmission flag, it adds one to the previous redundancy version and attempts to decode E-DPDCH using the previous transport format combination. The new-transmission flag can be transmitted from UE to NodeB by either adding a specific code word on the current E-DPCCH or by means of a separate physical code channel. This avoids the NodeB from having to attempt to decode a received E-DPDCH frame multiple times for each possible redundancy version, which function would otherwise need to be performed when an E-DPDCH frame is received without a corresponding E-DPCCH.

A fourth embodiment is a modification of the second embodiment in which a new-tx-flag is transmitted when E-DPCCH is turned off and a new E-DPDCH frame is being transmitted for the first time.

DETAILED DESCRIPTION

Figure 1:
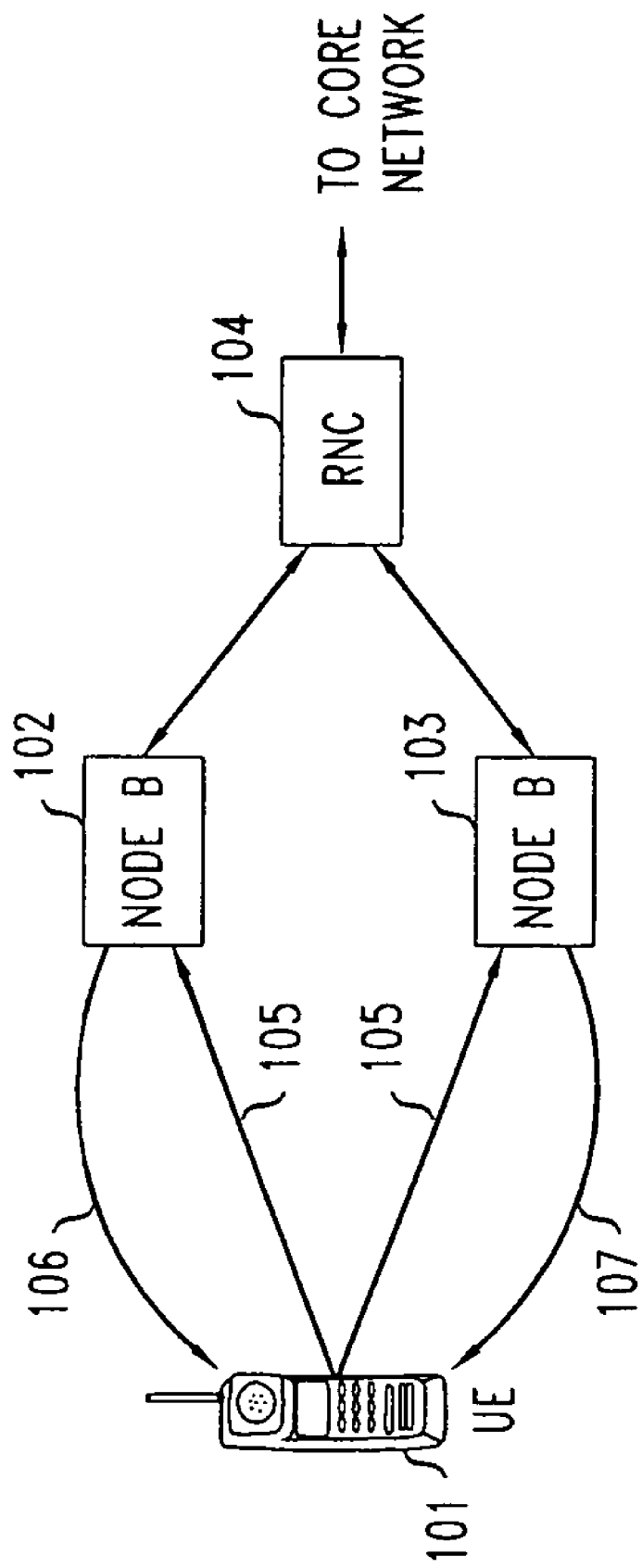
FIG. 1 is a block diagram showing a UE communicating on the uplink on the E-DPDCH and E-DPCCH with two NodeBs in a soft handoff situation, in accordance with the prior art.

With reference to FIG. 1, UE 101 is shown communicating on the enhanced data channel in a soft handoff situation with both NodeB 102 and NodeB 103. NodeB 102 and NodeB 103 are illustratively shown connected to the same multi-NodeB (or multi-base station) controller 104, referred to herein and in UMTS terminology as an RNC (Radio Network Controller). For clarity purposes, connections of RNC 104 to the core network are not shown, but are understood to exist by those skilled in the art. The transmissions labeled 105 indicate that UE 101 is sending a frame on the uplink through E-DPDCH and E-DPCCH to NodeBs 102 and 103. Both NodeBs 102 and 103 independently attempt to decode the E-DPDCH and E-DPCCH transmissions. If the E-DPDCH frame is successfully decoded by either NodeB 102 or NodeB 103, the NodeB that decodes the frame sends a positive acknowledgment (ACK) to UE 101 by either transmission 106 from NodeB 102 or transmission 107 from NodeB 103. If UE 101 receives an ACK from either NodeB 102 or NodeB 103, it thereafter transmits a new data frame. If UE 101 receives negative acknowledgments (NACKs) from both NodeBs 102 and 103, it will retransmit the same data frame. The retransmission procedure for that frame is terminated when either an ACK is received from one of the NodeBs, or the maximum allowable number of retransmission is reached.

Figure 2:
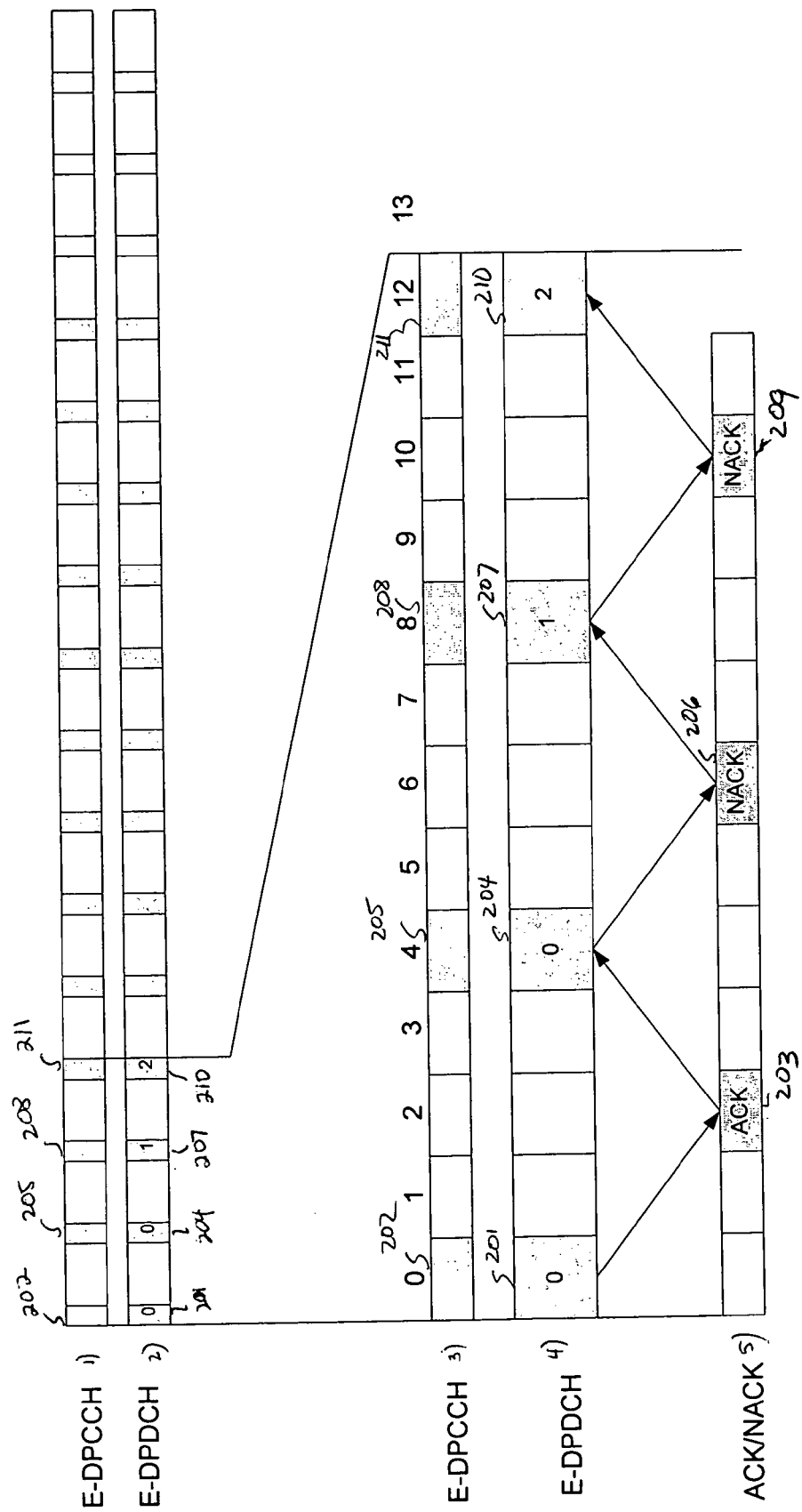
FIG. 2 shows the prior art timing relationship between E-DPCCH, E-DPDCH, and the ACK/NACK received by NodeB in response to an E-DPDCH transmission.

FIG. 2 shows the exemplary timing diagram for the E-DPDCH and E-DPCCH HARQ (Hybrid Automatic Repeat Request) transmission and retransmission procedure as defined in the current art (3GPP Release 6 Standard). The timing diagram is for a 10 ms TTI, but what is described is equally applicable to a 2 ms TTI as would most likely be used for VoIP. What is shown is a single HARQ process. Other HARQ processes can be running in parallel in the time slots between this single illustrated process.

As can be noted, the E-DPDCH transmission is always accompanied by a corresponding E-DPCCH transmission. The lower half of FIG. 2 provides an expanded view of the transmission of the first four transmitted frames (numbered #0, #4, #8 and #12) of E-DPCCH and E-DPDCH, also showing illustrative ACK/NACKS received from NodeB in response to a transmitted E-DPDCH frame. As previously noted, each E-DPCCH word includes three pieces of information: the RSN (retransmission sequence number), the E-TFCI (E-DCH transport format combination indicator), and an H-bit (a Happy bit), for a total of 10 bits. When in frame #0 the UE starts a new frame transmission 201 on E-DPDCH thus having a retransmission sequence number of "0", which is indicated by the "0" noted within the frame in FIG. 2, a corresponding E-DPCCH transmission 202 is made on the uplink during that frame. Assuming for illustration purposes that UE receives an ACK 203 from at least one NodeB in frame #2, a new E-DPDCH transmission 204 (again indicated by "0" within frame) is made in frame #4 together with an associated E-DPCCH transmission 205. If in frame 6 the UE receives NACKS 206 from all NodeBs, then the transmission made in frame 4 has failed and the UE, in frame 8, makes a first E-DPDCH retransmission 207 (indicated by "1" within the frame) of the previously transmitted frame together with an associated E-DPCCH transmission 208. If in frame #8 the UE again receives NACKS 209 from all NodeBs, then the transmission made in frame #8 has failed again and the UE, in frame #12, makes a second E-DPDCH retransmission (indicated by "2" within the frame) together with an associated E-DPCCH transmission 211. It should be noted that the UE moves to a new retransmission for a given HARQ process only when either a positive acknowledgement ACK for the previous frame has been received from one of the NodeBs that listen to it, or the maximum allowable number of retransmissions has been reached for the previous frame.

The capacity for those applications using the enhanced data channel on the uplink is increased by reducing the required E-DPCCH power for applications such as VoIP where the data rate usually does not change and remains constant. For example, the data rate for a VoIP user can be determined by that user's specific vocoder. As a result, the number of data bits per E-DPDCH frame is also constant in general and its specific size is vocoder dependent. In this case, there is no need for the UE to notify the NodeB of the E-DPDCH transport format combination for every E-DPDCH frame transmission, as the information relating to E-DPCCH becomes redundant. In general, it can be expected that applications will have periods of constant transport format combinations and transport channel packet sizes, which do not necessarily depend on an application itself but can also be achieved by the network granting a certain maximum packet size that a UE can use.

In accordance with an embodiment of the invention, E-DPCCH is transmitted only when it is needed to signal a new data format. In particular, E-DPCCH is transmitted when the E-DPDCH transport format combination is different from the one for the previous frame transmission that was sent utilizing the same HARQ process. Dedicated HARQ processes can be configured for specific logical channels corresponding to different traffic processes. For example, a certain HARQ process could be reserved for VoIP traffic carrying out non-scheduled transmissions, while another HARQ process could be configured for scheduled transmission of best effort data. Other HARQ processes could be configured for the transmission of video or other types of data. For both VoIP and best effort data HARQ processes, for example for a single transport channel, the physical layer packet sizes are constant for most of the time since the number of bits for header-compressed VoIP frames can be assumed to be constant and the maximum granted number of bits per frame in the case of best effort data can be assumed to be constant in a full buffer model. Hence, the E-TFCI is also constant for most of the time in these examples.

In a first exemplary embodiment, within a HARQ process, the E-DPCCH is transmitted until all the NodeBs within a transmitting UE's active set of NodeBs have returned at least one positive acknowledgement indicating that each such NodeB has received the E-DPCCH transmission and has used its information to successfully decode at least one E-DPDCH frame. The E-DPCCH transmission for that HARQ process is then switched off since all the NodeBs in the active set have obtained the latest E-DPDCH transport format combination, which becomes redundant for as long as it remains constant.

The behavior at a NodeB with which the UE is communicating depends on whether E-DPCCH is received and decoded successfully. If it is received and decoded successfully, then NodeB uses the transport format combination information and redundancy information from the decoded E-DPCCH to decode the E-DPDCH data. If no E-DPCCH transmission is received, the NodeB assumes that the transport format combination information is the same as in the last received transmission. The NodeB, however, remains blind on whether UE is transmitting a new data frame or retransmitting a previously transmitted data frame. Therefore, NodeB needs to decode each data frame received on E-DPDCH multiple times based on all the possible redundancy versions for the currently received TTI. Assuming, for example, that the maximum allowable number of transmissions (original transmission and retransmissions) for a data frame in the current process is N (i.e., up to N−1 retransmissions allowed), the NodeB needs to decode each E-DPDCH data frame up to N times: first decoding the data assuming that the frame is a new transmission; if it fails, then decoding the data assuming that the frame is a first retransmission; etc.; and finally, decoding the data assuming that the frame is the (N−1)th retransmission if all the preceding effort failed. This procedure stops either when the decoding succeeds with a "good" CRC check, or when all N attempts to decode the data have failed. Implementing this multiple-decoding scheme within NodeB thus increases decoding complexity by up to N times. In practice, N will have a value in the range of 2-4 or 2-6. To limit the implementation complexity in the receiver, it might be desirable to limit use of this mechanism to applications in which only a low number of retransmissions are allowed and which have small number of bits per frame.

The active set of NodeBs with which a UE is communicating will be updated depending on the signal-to-noise and interference ratio for reception from particular NodeBs. NodeBs that are newly added to a UE's active set do not know the transport format combination information when E-DPCCH is switched off. This problem can be resolved in several exemplary ways. The first example is an RNC-based solution where the RNC relays the latest E-DPDCH transport format combination information from a NodeB that is within the active set to this newly added NodeB. The second example is a UE-based solution where the UE resumes E-DPCCH transmissions when a new NodeB is added to its active set. The E-DPCCH transmission continues until the newly added NodeB returns a positive acknowledgment on an E-DPDCH transmission, thus indicating that it has also obtained the transport format combination information conveyed by E-DPCCH.

In a second exemplary embodiment, E-DPCCH is transmitted when either the transport format combination for a current frame is different from that of the previous frame or negative acknowledgements are received from all NodeBs for all the transmission and retransmissions of the previous frame and continues until the first positive acknowledgement from at least one NodeB is received. Illustrating this methodology, the case when the UE changes its E-DPDCH transport format combination that was constant over a certain time period to another transport format combination is considered. The UE thus needs to transmit E-DPCCH when the E-DPDCH is changed to the new transport format combination. In this embodiment, the UE continues transmitting E-DPCCH until at least one NodeB has successfully decoded E-DPDCH with the new transport format combination and returned a positive acknowledgement. When at least one NodeB with good reception has acquired the new transport format combination, the UE switches off E-DPCCH transmission. If all NodeBs fail to return a positive acknowledgement at a later stage even after the maximum number of retransmissions of a frame, E-DPCCH transmission is resumed until at least one NodeB successfully decodes the E-DPDCH transmission.

If a NodeB is newly added to a UE's active set while E-DPCCH is switched off, at least one NodeB can decode E-DPDCH transmission successfully. Therefore, the newly added NodeB will then not have the current E-DPDCH transport format combination information and cannot contribute decoding the E-DPDCH and E-DPCCH right away. However, this is an acceptable behavior when the UE can keep receiving at least one positive acknowledgement from the other NodeBs for each transmitted frame. The newly added NodeB can acquire the transport format combination information from the next E-DPCCH transmission either when all other NodeBs have failed to return a positive acknowledgement even after retransmissions or when the transport format combination is changed.

In this second embodiment, the behavior at a NodeB is identical to that previously described in conjunction with the first embodiment. Thus, E-DPDCH may need to be decoded up to N times if N−1 retransmissions are permitted for the current process.

Figure 3:
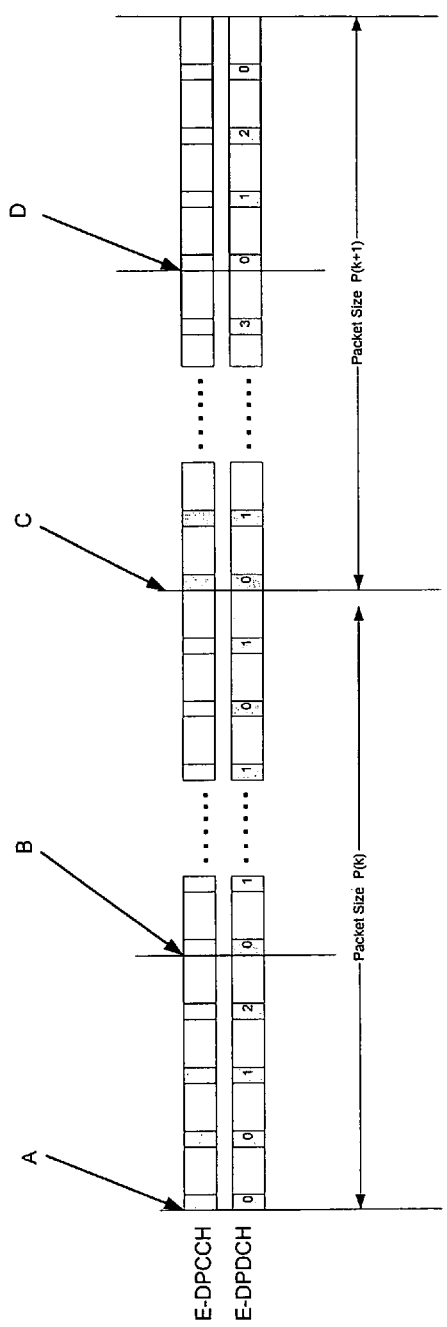
FIG. 3 shows the timing relationship between E-DPCCH and E-DPDCH in accordance with first and second embodiments of the present invention.

FIG. 3 shows the timing relationship between E-DPCCH and E-DPDCH in accordance with the first and second embodiments described above. At point A, an E-DPCCH "start criterion" is met and the UE resumes E-DPCCH transmission from the same time instance. At point B, an E-DPCCH "stop criterion" is met and the E-DPCCH is totally turned off from that point on. At point C, when a "start criterion" is met again, the UE resumes E-DPCCH transmission until point D when an E-DPCCH "stop criterion" is met. The specific "start criterion" and "stop criterion" may vary depending on the specific implementation. In the first embodiment described above, the "start criterion" is when the transport format combination differs from the transport format combination of the previous transmitted packet within the same HARQ process, and the "stop criterion" occurs when all the NodeBs that communicate with the UE have returned at least one positive acknowledgement after the most recent "start criterion" is met. In the second embodiment described above, the "start criterion" is either when the transport format combination differs from the transport format combination of the previously transmitted frame that was transmitted on the same HARQ process, or when all the NodeBs that communicate with the UE have returned negative acknowledgements on the previous frame that was sent on the same HARQ process through retransmissions. The "stop criterion" in this embodiment is when at least one NodeB that communicates with the UE has returned one positive acknowledgement after the most recent "start criterion" is met.

A third embodiment is a modification of the first described embodiment in which the complexity of NodeB implementation is simplified. In this embodiment, which is otherwise identical to above-described first embodiment, the UE also sends a 1-bit new-transmission flag (new-tx-flag) to the NodeB when a new E-DPDCH frame is transmitted for the first time when E-DPCCH is turned off. The need to decode a received E-DPDCH frame multiple times at NodeB can thereby be avoided when E-DPCCH is switched off, thus reducing the NodeB implementation complexity. In accordance with this embodiment, if NodeB detects an E-DPCCH transmission but not the new-tx-flag, then NodeB uses redundancy version and transport format combination from the decoded E-DPCCH frame to decode E-DPDCH. If NodeB does not detect an E-DPCCH transmission but detects the new-tx-flag, then NodeB uses the transport format combination and redundancy_version=0 (i.e., a new transmission) to decode E-DPDCH. If Node B detects neither an E-DPCCH transmission nor a new-tx-flag, then NodeB uses the transport format combination and redundancy_version =previous redundancy_version +1 to decode E-DPDCH. Therefore, the NodeB uses the last detected new-tx-flag to synchronize the UE's redundancy version.

A fourth embodiment is a modification of the second embodiment. In this embodiment, which is otherwise identical to above-described second embodiment, the UE also sends a 1-bit new-transmission flag (new-tx-flag) to the NodeB when a new E-DPDCH frame is transmitted for the first time when E-DPCCH is turned off. The need to decode a received E-DPDCH frame multiple times at NodeB can thereby be avoided when E-DPCCH is switched off, thus reducing the NodeB implementation complexity.

Figure 4:
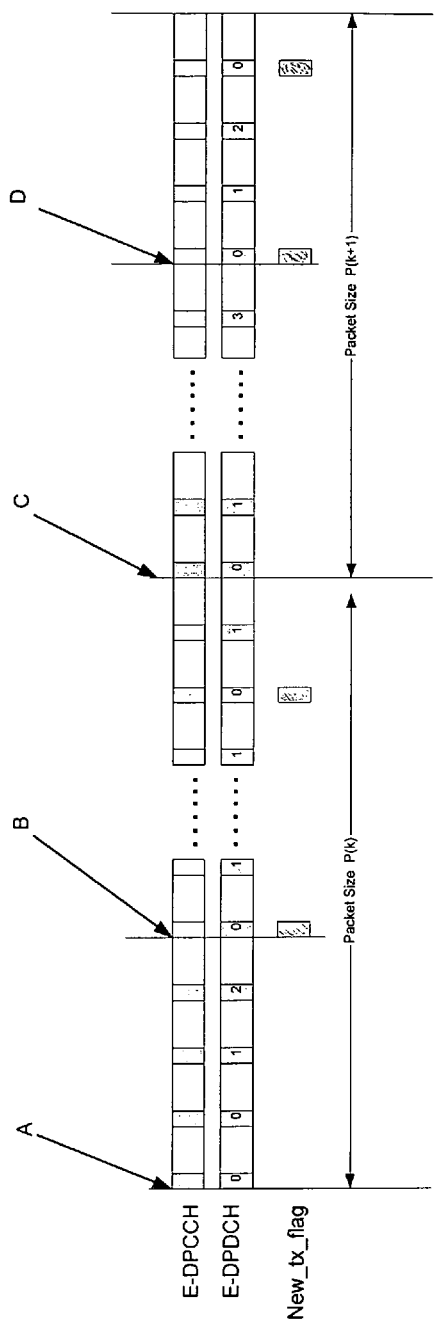
FIG. 4 shows the timing relationship between E-DPCCH, E-DPDCH, and new-tx-flag, in accordance with third and fourth embodiments of the present invention.

FIG. 4 shows the timing relationship between E-DPCCH, E-DPDCH and new-tx-lag for the third and fourth embodiments. As can be noted, the new-tx-flag is transmitted with every new E-DPDCH transmission (marked with redundancy version "0" during the period where E-DPCCH is turned off (i.e., between point B and C, and after point D, but not at the other times when the redundancy version is "0" and E-DPCCH is transmitted.

As noted, as compared with the first and second embodiments, the third and fourth embodiments simplify the NodeB implementation by eliminating the need to decode the same E-DPDCH frame multiple times at the expense of consuming minimum air interface resources to transmit the new-tx flag. The new-tx-flag could be transmitted from UE to NodeB by either adding a specific code word on the current E-DPCCH or by means of a separate physical code channel. Power consumption for transmitting a single bit only for new transmissions is significantly less than the power consumption for transmitting a 10-bit E-DPCCH frame with each E-DPDCH frame, as per the prior art. Thus, the new-tx flag transmission uses much less resources than are required for E-DPCCH transmission.

The Happy (H) bit is typically not used for applications such as VoIP, which is delay sensitive. Thus, turning E-DPCCH off and not providing that information will not have a deleterious effect.

Although described above in conjunction with embodiments that are in accord with UMTS standards, the present invention could be applicable to other wireless standards in which a high-speed data packet channel and accompanying control channel are transmitted on the uplink or downlink between a mobile terminal and a base station or similar device, as for example wireless systems that are in accord with EVDO standards, WiMAX standards, or other standards that have been adopted or proposed, or standards that have not yet been adopted or proposed.

Accordingly, the above described embodiments are merely illustrative of the principles of the present invention. Other embodiments could be devised by those skilled in the art without departing from the spirit and scope of the present invention.

The invention claimed is:

1. A method for data transmission in a wireless communication system, the wireless communication system including at least one dedicated physical data channel operative to carry user data transmitted from a user and at least one associated dedicated physical control channel operative to carry control information used for decoding the user data being transmitted via the dedicated physical data channel, the method comprising the steps of:

at an initiation of a transmission interval for transmitting the user data via the at least one dedicated physical data channel, causing associated control information to be transmitted via the at least one dedicated control data channel;

monitoring the user data transmitted during the transmission interval for the presence of a predetermined stop condition, the stop condition being determined in respect to a period during which a transmission data format for the user data remains substantially unchanged;

upon a determination that the predetermined stop condition is present, stopping transmission of the control information associated with the transmitted user data until one of at least one predetermined start conditions is determined to occur in the transmitted user data.

2. The method of claim 1 wherein a predetermined start condition occurs when a frame of data being transmitted on the dedicated physical data channel differs in the transport format combination from a frame of data previously transmitted on the dedicated physical data channel in a same process.

3. The method of claim 2 where the transport format combination comprises a packet size.

4. The method of claim 1 wherein a predetermined stop condition occurs when notification is received that at least one or more frames of data transmitted on the dedicated physical data channel has been successfully decoded at one or more destinations to which the packets were transmitted.

5. The method of claim 1 wherein a predetermined start condition occurs when a frame of data being transmitted on the dedicated physical data channel differs in the transport format combination from a frame of data previously transmitted on the dedicated physical data channel in a same process, and the predetermined stop condition occurs when notification is received that all the destinations to which the frames of data were transmitted have successfully decoded at least one frame of data.

6. The method of claim 1 wherein a first predetermined start condition occurs when a frame of data being transmitted on the dedicated physical data channel differs in the transport format combination from a frame of data previously transmitted on the dedicated physical data channel in a same process and a second predetermined start condition occurs when notification is received that all destinations to which the frames of data are being transmitted have failed to successfully decode a transmitted frame of data after a maximum number of allowable retransmissions, and a stop criterion occurs when notification is received that at least one destination to which the frames of data are being transmitted has successfully decoded at least one transmitted frame of data.

7. The method of claim 2 further comprising transmitting a flag in association with a frame of data transmitted on the dedicated data channel when the frame of data is being transmitted for the first time and transmission of control information on the dedicated physical control channel is in the stop condition.

8. The method of claim 7 wherein the flag is a single bit and is transmitted on the dedicated physical control channel.

9. The method of claim 7 wherein the flag is a single bit and is transmitted on a separate channel.

10. The method of claim 1 wherein the dedicated physical control channel is the enhanced dedicated physical data channel (E-DPDCH) and the dedicated physical control channel is the associated enhanced dedicated physical control channel (E-DPCCH) that are both transmitted on the uplink in a Universal Mobile Telecommunications System (UMTS).

11. The method of claim 1 wherein user data received via the at least one dedicated physical data channel that does not have associated control information is decoded using transport format combination information previously received on the dedicated physical control channel in association with a previously received frame of data.

12. The method of claim 11 further comprising the step of:
attempting to decode the present frame of data for each possible redundancy version of the present frame of data.

13. The method of claim 11 further comprising the step of:
if the present frame of data is received on the dedicated physical data channel and corresponding control information is not received on the associated dedicated physical control channel and a flag representing a new frame transmission is received in association with the present frame of data, then using transport format combination information previously received on the dedicated physical control channel in association with a previously received frame of data to decode the present frame of data with an assumed redundancy version equal to zero.

14. The method of claim 11 further comprising the step of:
if the present frame of data is received on the dedicated physical data channel and corresponding control information is not received on the associated dedicated physical control channel and a flag representing a new frame transmission is not received in association with the received frame of data, then deriving a redundancy version of the received frame of data from a previously detected flag and using the derived redundancy version in combination with transport format combination information previously received on the dedicated physical control channel in association with a previously received frame of data to decode the present frame of data.

* * * * *

UNITED STATES PATENT AND TRADEMARK OFFICE
CERTIFICATE OF CORRECTION

PATENT NO. : 7,526,304 B2  
APPLICATION NO. : 11/239604  
DATED : April 28, 2009  
INVENTOR(S) : Rainer Walter Bachl et al.

Page 1 of 1

It is certified that error appears in the above-identified patent and that said Letters Patent is hereby corrected as shown below:

In the Claims

Column 8, lines 55-67 and Column 9, lines 1-11, Claim 1 should read

1. A method for data transmission in a wireless communication system, the wireless communication system including at least one dedicated physical data channel operative to carry user data transmitted from a user and at least one associated dedicated physical control channel operative to carry control information used for decoding the user data being transmitted via the dedicated physical data channel, the method comprising the steps of:

at an initiation of a transmission interval for transmitting the user data via the at least one dedicated physical data channel, causing associated control information to be transmitted via the at least one dedicated control data channel;

monitoring the user data transmitted during the transmission interval for the presence of a predetermined stop condition, the stop condition being determined in respect to a period during which a ~~transmission data format~~ <u>transport format combination</u> for the user data remains substantially unchanged;

upon a determination that the predetermined stop condition is present, stopping transmission of the control information associated with the transmitted user data until one of at least one predetermined start conditions is determined to occur in the transmitted user data.

Signed and Sealed this  
Twenty-fifth Day of November, 2014

Michelle K. Lee  
*Deputy Director of the United States Patent and Trademark Office*